United States Patent [19]

Ross et al.

[11] Patent Number: 5,250,311
[45] Date of Patent: Oct. 5, 1993

[54] APPARATUS AND METHOD FOR PEELING AND CORING PERISHABLE PRODUCE

[75] Inventors: Edward E. Ross, San Rafael; Ronald J. Thibault, Saratoga, both of Calif.

[73] Assignee: Del Monte Corporation, San Francisco, Calif.

[21] Appl. No.: 934,426

[22] Filed: Aug. 24, 1992

[51] Int. Cl.$^5$ .......................... A23P 1/00; A23N 4/00
[52] U.S. Cl. ...................................... 426/231; 99/549; 99/550; 99/561; 99/565; 426/484
[58] Field of Search .................. 426/231, 484; 99/549, 99/550, 561, 564, 565

[56] References Cited

U.S. PATENT DOCUMENTS

3,117,605   1/1964   Creed et al. .......................... 426/484
4,262,025   4/1981   Meissner ............................. 426/231

Primary Examiner—George Yeung
Attorney, Agent, or Firm—Flehr, Hohbach, Test, Albritton & Herbert

[57] ABSTRACT

A peeling and coring apparatus (20) for use with perishable produce (24) having a tapered neck portion (32) of reduced transverse dimension. Upon placement of the produce (24) into a tapered coring cup (30) formed to receive the produce (24), a detecting mechanism (36) detects the extension of the tapered neck portion (32) into the coring cup (30) by a distance sufficient to indicate proper orientation of the produce (24) relative to the coring cup (30). If the detecting mechanism (36) determines that the produce (24) is improperly oriented relative the coring cup (30), the peeling and coring apparatus (20) removes the produce (24) from the coring cup (30) prior to further processing of the produce (24). If the detecting mechanism (36) determines that the produce (24) is properly oriented, a gripping mechanism (34) grips the produce (24) to secure it against the coring cup (30) in preparation for further processing such as peeling and coring.

41 Claims, 5 Drawing Sheets

APPARATUS AND METHOD FOR PEELING AND CORING PERISHABLE PRODUCE

TECHNICAL FIELD

The present invention relates, generally, to apparatus for peeling and coring perishable produce and, more particularly, to an improved method and apparatus for detecting proper orientation of the produce thereon.

BACKGROUND ART

Automated peeling and coring machinery for perishable produce have long been applied to the canning industry. Specifically, these apparatus have revolutionized mass production of canned fruits such as pears, peaches, pineapples and apples, for example.

Peeling and coring machinery are complicated devices sequencing several hundred levers, cams, springs, air cylinders and precisely timed belts with precise clearances. These machines operate under extremely adverse conditions including pear debris and slurry, together with water dripping on most moving parts.

Figure 1A:
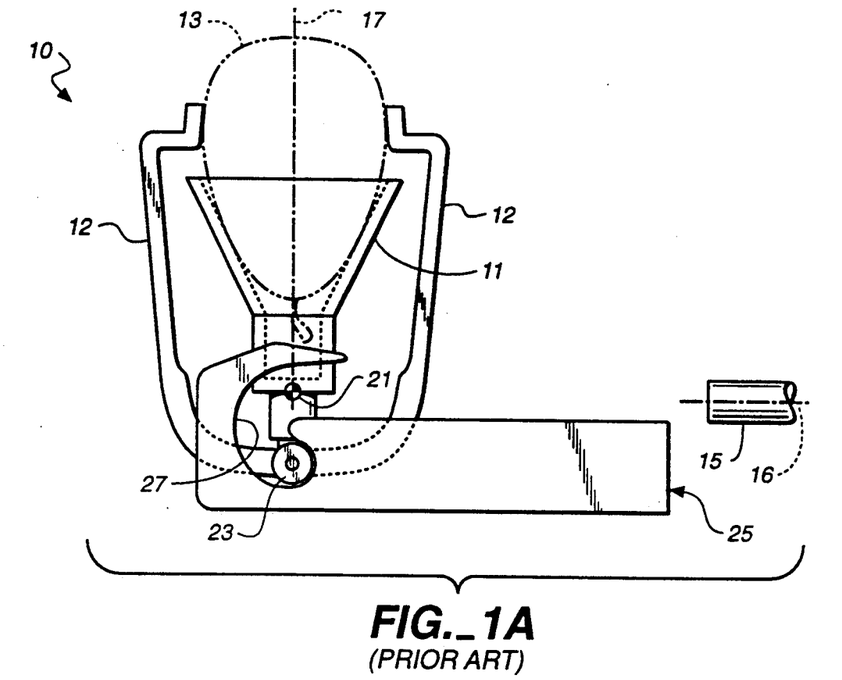
FIGS. 1A-1D shows a series of partially fragmentary, side elevational views of a prior art peeling and coring apparatus receiving a properly aligned and positioned perishable produce in a coring cup and mounting the produce on a coring tube.

Typically, individual fresh fruits are positioned in aligning chutes which direct the same to an orienting chamber where an orienting member causes the fruit to be rotated to an aligned position. After general alignment, a plunger member transfers the fruit to a transfer pocket which positions the fruit for receipt into a holding mechanism 10, as shown in FIG. 1A.

Figure 1B:
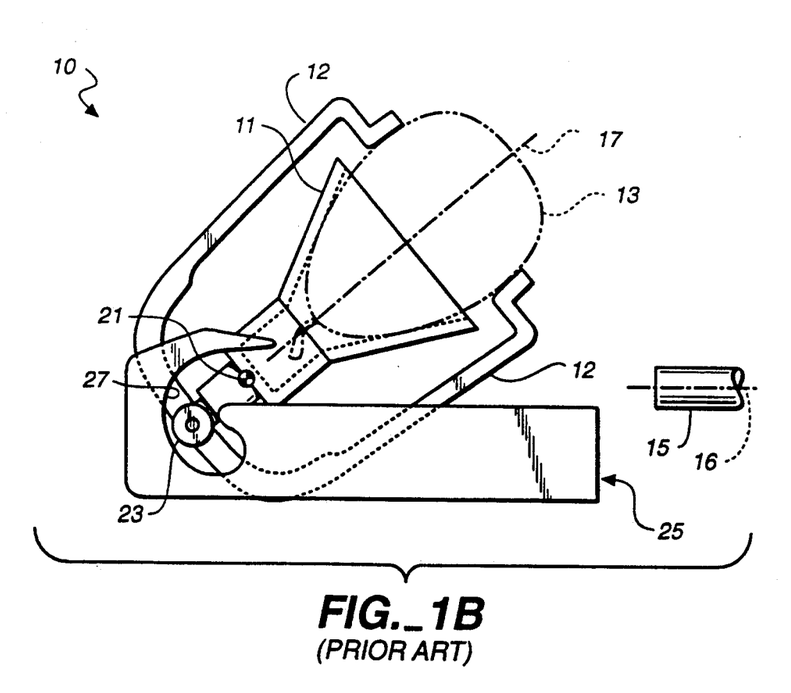
Figure 1C:
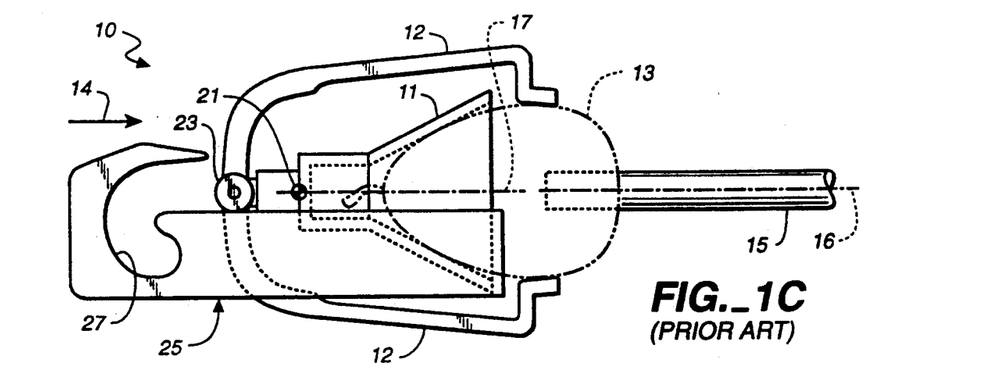
Figure 1D:
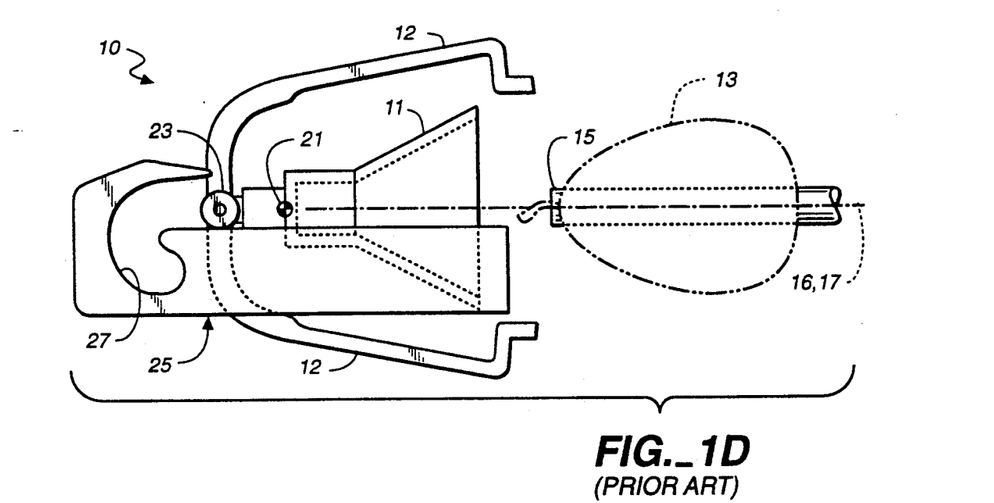

Holding mechanism 10 includes a coring cup positioned below the transfer pocket (not shown) and gripping arms 12 formed to grip the outer surface of fruit 13 to secure fruit 13 in coring cup 11. A presser arm (not shown) is activated which urges fruit 13 downwardly from the transfer pocket to coring cup 11 where gripping arms 12 are caused to engage and grasp fruit 13. Holding mechanism 10 is then swiftly pivoted as a unit (FIG. 1B) toward a hollow coring tube to the position shown in FIG. 1C. Holding mechanism 10 is then thrust forward, in the direction of arrow 14, where fruit 13 is impaled by hollow coring tube 15 which completely thrusts therethrough to remove the seed cavity, core and stem from fruit 13 therefrom (FIG. 1D). Fruit 13 is then suspended therefrom and caused to spin about the longitudinal axis 16 of coring tube 15 where a rotary knife (not shown) follows the contour of the fruit to peel the skin therefrom in a lathe-type fashion.

While these peeling and coring apparatus have been adequate in most instances, several problems are inherent in these designs. For example, very large fruit can be heavy and, hence, exhibit significant inertial characteristics during swift pivotal motion of holding mechanism 10 to the thrusting (horizontal) position (FIGS. 1A-1C). Even when properly secured in gripping arms 12, large fruit may be thrown from or become misoriented in coring cup 11. Moreover, large fruit often contacts coring tube 15 or the peeling and halving knives (not shown) as holding mechanism 10 is pivotally moved to the horizontal position of FIG. 1C. Holding mechanism 10 is generally pivotally mounted at pivotal axis 21 to a movable carriage assembly (not shown) which moves forward in the direction of arrow 14 towards coring tube 15 during normal machine sequencing. A spring mechanism (not shown), coupled between holding mechanism 10 and the movable carriage, biases mechanism 10 toward the thrusting position. To control the pivotal movement of holding mechanism 10, a cam roller 23 is rotatably mounted thereto for tracking engagement with a stationary hook cam 25 rigidly coupled to the peeling and coring apparatus frame (not shown). Thus, as the carriage begins to move forward (FIGS. 1A-1C), the spring mechanism urges cam roller 23 rearward from the eye of a curved cam portion 27 of hook cam 25 which causes cam roller 23 to track therethrough to control the pivotal movement of holding mechanism 10 about pivotal axis 21. Because mechanism 10 moves forward (via the movable carriage) and closer to coring tube 15 very large fruit 13 often contacts tube 15 or peeling and halving knives during pivotal motion of coring cup 11 which misorients fruit 13 relative coring cup 11.

Another problem associated with the current peeling and coring machinery is that it is imperative to properly align the longitudinal center axis 17 of fruit 13, which fruit 13 and its seed cavity are generally symmetrically contained thereabout, with the longitudinal axis 16 of coring tube 15 before fruit 13 is thrust onto coring tube 15. Such alignment assures proper coring and peeling of fruit 13 when spun about coring tube 15, as best viewed in FIGS. 1C and 1D.

Figure 2:
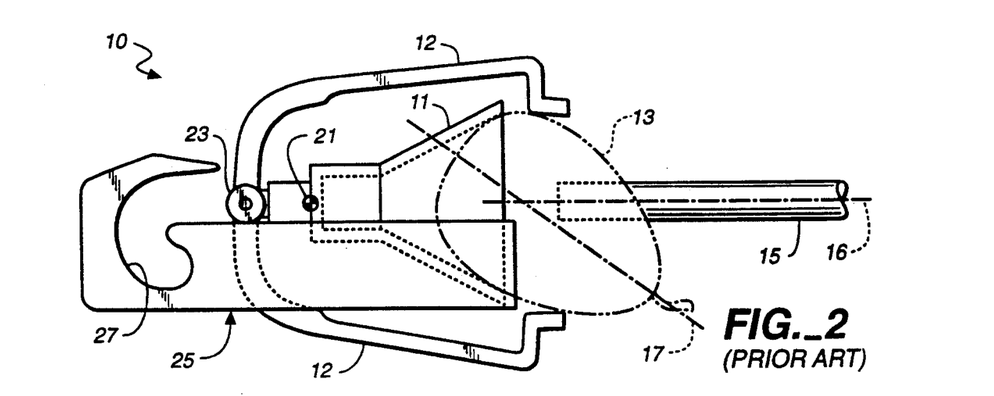
FIG. 2 is a partially fragmentary, side elevational view of the prior art apparatus of FIG. 1 and illustrating the produce improperly aligned and positioned on the coring tube.

However, the natural variation in the shape of the fruit, ripeness, the amount of water sprayed thereon or the texture of the skin may resist turning of fruit 13 in the transfer pocket, causing misorientation or misalignment in the coring cup. Up to twenty percent of the time, fruit 13 is poorly positioned in the transfer pocket so that when the pressing arm urges fruit 13 toward coring cup 11, fruit 13 is improperly seated therein. Thus, as shown in FIG. 2, the longitudinal center axis 17 of fruit 13 is not aligned with the longitudinal axis 16 of coring tube 15 and fruit 13 is eccentrically positioned on hollow coring tube 15. As a result, upon thrusting of fruit 13 onto coring tube 15, tube 15 will not pass through the longitudinal center axis to properly remove the core and seed material. Moreover, fruit 13 will not be peeled properly due to the non-symmetry about the longitudinal axis 16 of coring tube 15.

These defective fruits must be hand sorted out from the batch because they are not acceptable for the high margin premium quality pack. Rather, they will be either discarded as waste or downgraded to chunks or low margin fruit slurry. This results in a substantial annual product and monetary losses.

SUMMARY OF INVENTION

Accordingly, it is an object of the present invention to provide a peeling and coring apparatus and method which properly peels and cores a perishable produce.

Another object of the present invention is to provide a peeling and coring apparatus and method which minimizes losses due to improperly cored and peeled perishable produce.

Still another object of the present invention is to provide a peeling and coring apparatus and method which detects when the perishable produce is improperly positioned on the apparatus.

It is another object of the present invention to provide a peeling and coring apparatus and method which will automatically remove the perishable produce from the apparatus.

Yet another object of the present invention is to provide an improvement to a existing peeling and coring apparatus which can be easily retrofit to existing peeling and coring machinery.

It is a further object of the present invention to provide a peeling and coring apparatus and method which is durable, compact, easy to maintain, has a minimum number of components, is easy to use by unskilled personnel, and is economical to manufacture.

The present invention includes an apparatus for coring (and preferably peeling) perishable produce having a tapered neck portion of reduced transverse dimension. The apparatus comprises a holding mechanism for supporting the produce including a tapered coring cup having a narrow proximal end formed to receive the produce. A detecting mechanism is aligned relative to a narrow proximal end of the coring cup for detecting the projection of the tapered neck portion into the narrow proximal end by a sufficient distance to indicate proper orientation of the produce relative to the coring cup. A mechanism for removing the produce from the coring cup is provided which is operably coupled to the detecting mechanism. The removing mechanism is activated upon the failure of the detecting mechanism to detect the proper orientation. A coring tube is positioned proximate the coring cup for coring the produce. A mechanism producing relative motion between the holding mechanism and the coring tube to cause impaling of the produce onto the coring tube when the detecting mechanism detects the proper orientation.

A method is provided for insuring proper orientation of perishable produce during processing including the steps of depositing the produce into a tapered coring cup formed to receive and orient the produce. Detecting the presence of the tapered neck portion sufficiently close to a narrow end of the coring cup to indicate proper orientation of the produce relative to the coring cup. Upon failure to detect the proper orientation, removing the produce from the coring cup prior to processing the produce. Upon detecting the proper orientation, gripping the produce by gripping means for further manipulation of the produce to effect processing.

The apparatus and method of the present invention has other objects and features of advantage which will be more readily apparent from the following description of the Best Mode of Carrying Out the Invention and the appended claims, when taken in conjunction with the accompanying drawing.

BEST MODE OF CARRYING OUT THE INVENTION

The coring apparatus (and preferably peeling) of the present invention reduces product loss by dispensing improperly oriented produce from the apparatus prior to coring an peeling. The following description is presented to enable a person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded with the widest scope consistent with the principles and features disclosed herein.

Figure 3A:
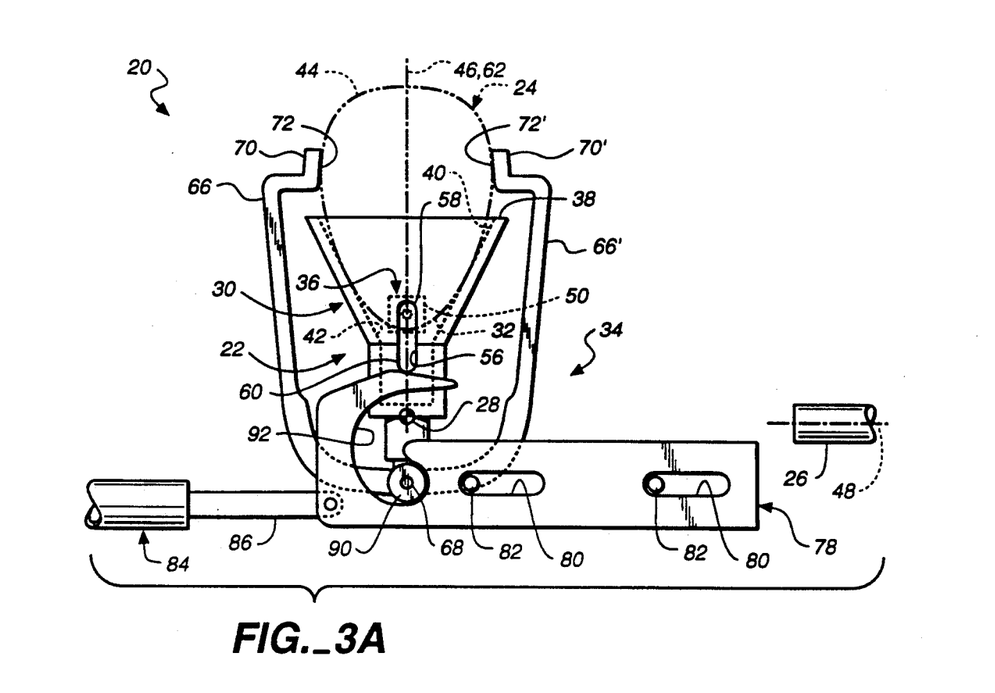
FIGS. 3A through 3C shows a series of partially fragmentary, side elevational views of a coring apparatus at various stages of operation and constructed in accordance with the present invention.
Figure 3B:
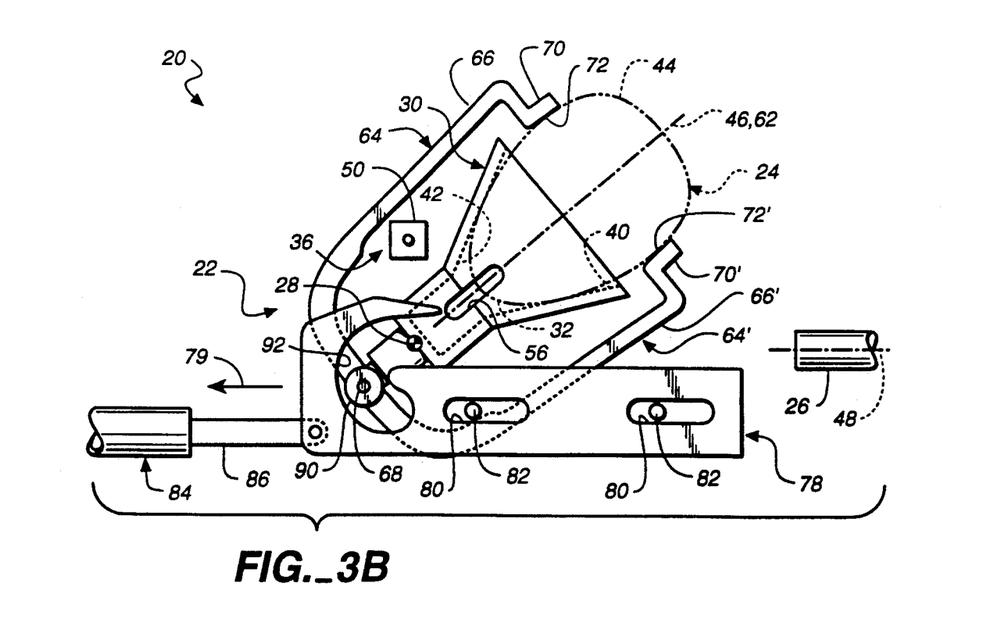
Figure 3C:
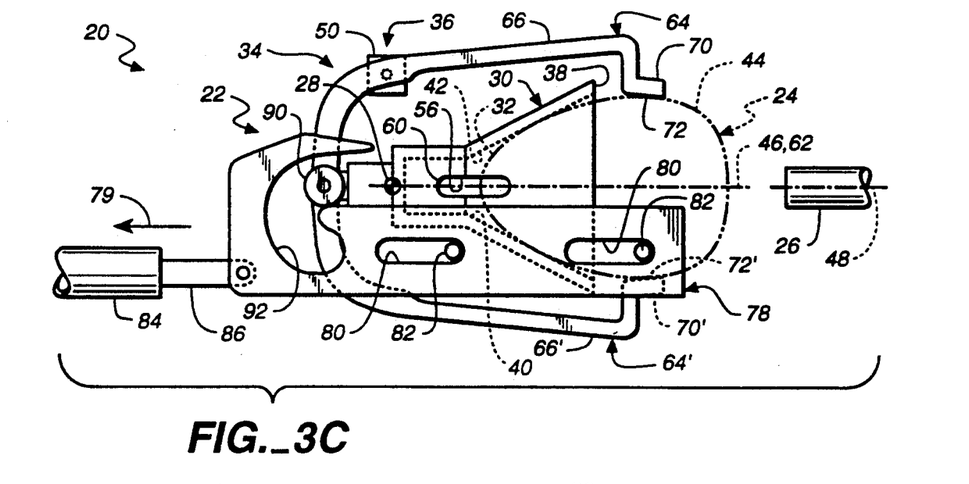

It will be noted here that for a better understanding, like components are designated by like reference numerals throughout the various figures. Attention is now directed to FIGS. 3A-3C, where the pertinent portion of a coring apparatus (and preferably peeling), generally designated 20, is illustrated. This portion of apparatus 20, briefly, includes a holding assembly, generally designated 22, formed to carry, support and align perishable produce 24 for aligned impaling by a coring tube 26. Holding assembly 22 is pivotally mounted at pivotal axis 28 to a movable carriage (not shown) between a receiving position (FIG. 3A) and a thrusting position (FIG. 3C). Assembly 22 includes a coring cup, generally designated 30, formed and dimensioned to receive perishable produce 24 having a tapered neck portion 32 of reduced transverse dimension, such as mangos, avocados, various melons, and most preferably, pears. Holding assembly 22 further includes gripping means 34 for releasably securing properly oriented produce 24 against coring cup 30.

In accordance with the present invention, upon produce 24 being deposited in coring cup 30, a detecting means 36 determines whether produce 24 is properly oriented relative to coring cup 30. This determination is performed prior to coring and peeling of produce 24 which begins when properly oriented produce 24 is impaled by coring tube 26. If produce 24 has been determined to be improperly oriented relative to coring cup 30 (FIG. 6A), produce 24 will be removed from coring cup 30 (FIG. 6B) so that the improperly oriented produce 24 may be recycled through apparatus 20 for proper processing.

On the other hand, in the event produce 24 is determined to be properly oriented, holding assembly 22 is moved relative to a coring tube 26 so that produce 24 can be prepared for further processing (generally, coring and peeling). Hence, produce 24 will not be removed from coring cup 30. In the preferred embodiment, as will be discussed in greater detail below, gripping means 34, responsive to detection of the proper orientation of produce 24 by detecting means 36 to grip produce 24, releasably retains produce 24 against coring cup 30 so that holding assembly 22 can be moved to the thrusting position (FIG. 3C) without loss of produce 24. Accordingly, produce 24 will remain properly oriented relative to cup 30 throughout movement of coring cup 30 in preparation for further processing.

Figure 4:
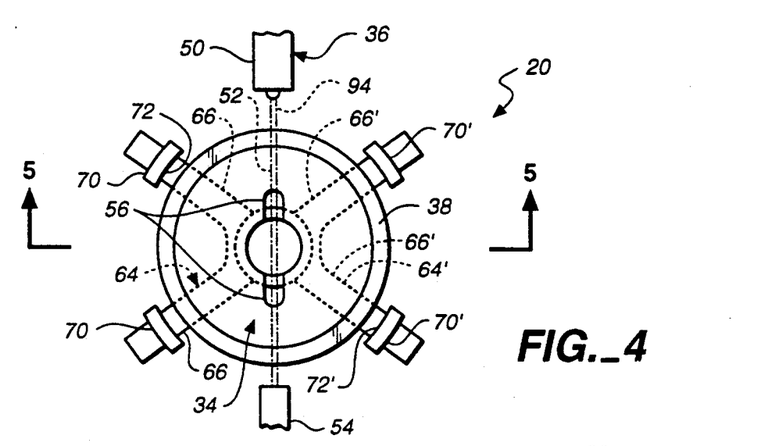
FIG. 4 is a top plan view of the coring apparatus of FIG. 3.
Figure 5:
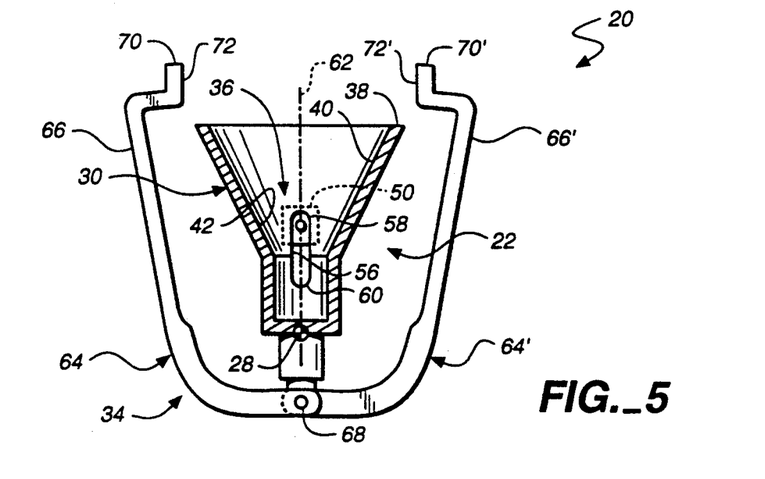
FIG. 5 is a side elevational view, in partial cross-section of the coring apparatus of FIG. 3 taken substantially along the plane 5—5 of FIG. 4.

Referring now to FIGS. 4 and 5, it may be viewed that coring cup 30 is generally funnel-shaped having a circumferential lip portion 38 forming an entrance to a receiving cavity 40. When coring cup 30 is situated in the receiving position (FIG. 5), receiving cavity 40 preferably faces upwardly for receipt of produce 24. Receiving cavity 40 is inclined inwardly from lip portion 38 at a slope preferably conforming to the inwardly tapered neck portion 32 of produce 24. Accordingly, the inclination of the taper may vary depending on the perishable produce being cored and peeled.

In accordance with the present invention, detecting means 36 senses the orientation of produce 24 relative to the coring cup 30. As shown in FIG. 3A, the inward taper of receiving cavity 40 is formed and dimensioned so that the neck portion 32 (stem end of produce 24) projects sufficiently into a narrow proximal end 42 of coring cup 30 with the rounded bottom end 44 of produce 24 facing away from receiving cavity 40. Accordingly, only upon proper orientation will neck portion 32 of produce 24 project into the narrow proximal end 42 of coring cup 30 by a distance sufficient to indicate proper orientation of produce 24 relative to coring cup 30. This is the preferred position and orientation of produce 24 relative to coring cup 30 which permits proper coring and alignment with coring tube 26. This configuration also assures that the longitudinal center axis 46 of produce 24 will be aligned with the longitudinal axis 48 of coring tube 26 when moved to the thrusting position (FIG. 3C). Hence, produce 24 can be simultaneously cored and peeled while properly suspended from coring tube 26 with greater accuracy, thereby substantially reducing improper coring and peeling of produce 24.

Generally, as above indicated, after movement to the thrusting position, holding assembly 22 is moved forward (via a movable carriage (not shown) in the direction of coring tube 26 until tube 26 impales produce 24 to remove the seed cavity, core and stem (not all shown). Subsequently, coring tube 26 is spun about its longitudinal axis wherein a rotary knife (not shown) follows along the contour of produce 24 to peel the skin therefrom. Peeled produce 24 is then removed from coring tube 26 which cores produce 24.

In the preferred embodiment, detecting means 36 is provided by an optical transmitter 50 (FIGS. 3-5) directing a light beam 52 through a portion of coring cup 30 to detect the presence of neck portion 32 projecting into narrow proximal end 42. Transmitter 50 is positioned sufficiently close to narrow proximal end 42 of coring cup 30 such that the tapered neck portion 32 of a properly positioned produce 24 impedes or obstructs the passage of light beam 52 through coring cup 30. Thus, by detecting whether beam 52 has passed through coring cup 30 to a receiver 54 mounted on the opposite side of coring cup 30, or has been obstructed by the presence of neck portion 32, it can be determined whether produce 24 is properly oriented in coring cup 30. Since only neck portion 32 can sufficiently project into narrow proximal end 42 of coring cup 30 by a distance sufficient to indicate proper orientation of produce 24 relative to coring cup 30, sensing the presence or non-presence of neck portion 32 thereof can determine whether the orientation of produce 24 is proper.

As best illustrated in FIG. 4, a viewing opening 56 extends through coring cup 30 which permits the transmission of light beam 52 therethrough. Opening 56 is preferably an elongated slot disposed proximate narrow proximal end 42 in order to allow a properly oriented neck portion 32 of produce 24 to impede or obstruct the passage of light through opening 56. It will be understood, of course, that when light beam 52 is not detected by receiver 54, detecting means 36 determines that neck portion 32 is properly projecting into the narrow proximal end 42 of coring cup 30 by an amount and, hence, properly oriented. On the other hand, when light beam 52 is detected by receiver 54, detecting means 36 determines that produce 24 is improperly oriented in coring cup 30 (FIG. 6A) because light beam 52 is neither obstructed nor impeded by neck portion 32 of produce 24. In this situation, produce 24 will be removed from holding assembly 22, as will be described below.

Optical transmitter 50 is position on one exterior side of coring cup 30 and aligned to transmit light beam 52 and extends near the bottom through opening 56, as shown in FIG. 4. Similarly, receiver 54 is positioned on an opposite exterior side of coring cup 30 and aligned on the opposite end of opening 56 to receive light beam 52 being transmitted therethrough. FIG. 5 illustrates that opening 56 is preferably an elongated slot which reduces potential misorientation of produce 24 should the stem (not shown for clarity) of produce 24 be positioned therein. Because elongated slot 56 extends nearly to the bottom of cup 30, the stem may extend sufficiently into elongated slot 56 in the longitudinal direction so as not to cause produce 24 to be upraised in coring cup 30.

Elongated opening 56 includes an upper portion 58 and a lower portion 60, and is vertically aligned substantially along the longitudinal axis 62 of coring cup 30 proximate the narrow proximal end 42 to increase the potential of detecting the presence of tapered neck portion therein. Preferably, transmitter 50 is aligned to pass light beam 52 through upper portion 58 of elongated opening 56. However, the transmission of light beam 52 through opening 56 may be arranged anywhere between upper portion 58 and lower portion 60 for tolerance and specification variations or the like.

Although opening 56 is preferably provided through coring cup 30, it will be understood that coring cup 30 could be substantially transparent so as to permit light beam 52 to transmit therethrough without the need for opening 56.

The sequence of determining the proper orientation of produce 24 relative to coring cup 30 is to transpire just after deposition of produce 24 into coring cup 30 but prior to movement of holding assembly 22 to the thrusting position. This sequence, which senses of the presence of neck portion 32 in narrow proximal end 42, can be determined precisely and quickly so as not to impede, disrupt or substantially delay the normal operation of peeling and coring apparatus 20. For example, above-mentioned sequence only requires about one second to perform.

In the preferred embodiment, optical transmitter 50 transmits an infrared light beam through opening 56 which is received by an infrared receiver 54 (FIG. 4). Infrared light is preferable to other light sources, such as visible light, because of infrared light's advantageous optical properties. It will be appreciated, however, that other wavelengths of light may be employed as well as any combination thereof. Further, detecting means 36 may be provided by a variety of sensory mechanisms such as pneumatic sensing devices which sense pressure changes. Moreover, detecting means 36 may include a mechanical device which senses contact with properly positioned neck portion 32 without departing from the true spirit and nature of the present invention.

In accordance with the present invention, holding assembly 22 of coring and peeling apparatus 20 includes gripping means 34 for gripping produce 24 while positioned in coring cup 30. Hence, gripping means 34 permits coring cup 30 to pivot about pivotal point 28 between the receiving position (FIG. 3A) and the thrusting position (FIG. 3C), or permits relative motion between holding assembly 22 and coring tube 26, while releasably securing produce 24 thereto for further processing. As best viewed in FIGS. 4 and 5, gripping means 34 includes a pair of gripping members 64 and 64' disposed on opposite sides of coring cup 30. Gripping members 64 and 64' are responsive to the detection of the proper orientation of produce 24 relative coring cup 30 by detecting means 36. Gripping members 64 and 64' are pivotally mounted to holding assembly 22 at pivotal axis 68 so that members 64 and 64 can move between an open position (FIG. 4 and 5) and a closed position (FIG. 3A), gripping produce 24 to permit further processing. As shown in FIG. 4, each gripping member 64, 64' includes a pair of spaced-apart arms 66 and 66' positioned substantially around coring cup 30. Each arm 66 and 66' is substantially J-shaped and diverges upwardly and outwardly from pivotal axis 68 to a position just above the lip portion 38 of coring cup 30. Hence, gripping members 64 and 64', being responsive to detection of the proper orientation of produce 24 by detecting means 36 to grip produce 24, can be moved to the closed position to releasably secure produce 24 thereto.

Each spaced-apart arm 66 and 66' includes fingers portions 70 and 70' extending inwardly toward the longitudinal axis 62 of coring cup 30 from the upper distal ends of arms 66 and 66'. Fingers 70 and 70' include a produce gripping surfaces 72 and 72' which is formed to engage the exterior surface of produce 24 when gripping members 64 and 64' is in the closed position.

In the preferred form, gripping members 64 and 64' are pneumatically activated upon favorable response by detecting means 36. However, mechanical activation may be employed as well.

Initially, when produce 24 is received in coring cup 30, gripping members 64 and 64' are situated in the open position (FIGS. 4 and 5) which permits produce 24 to be deposited into coring cup 30. After deposition, detecting means 36 is activated to determine whether produce 24 is correctly oriented in coring cup 30. When proper orientation is detected, gripping members 64 and 64', operably coupled to detecting means 36 and responsive to the detection of the proper orientation of produce 24, are moved to the closed position (FIG. 3A) to retain produce thereto. Holding assembly 27 can then be moved to the thrusting position together with produce 24 so that produce 24 may be subsequently properly impaled by coring tube 26.

Figure 6A:
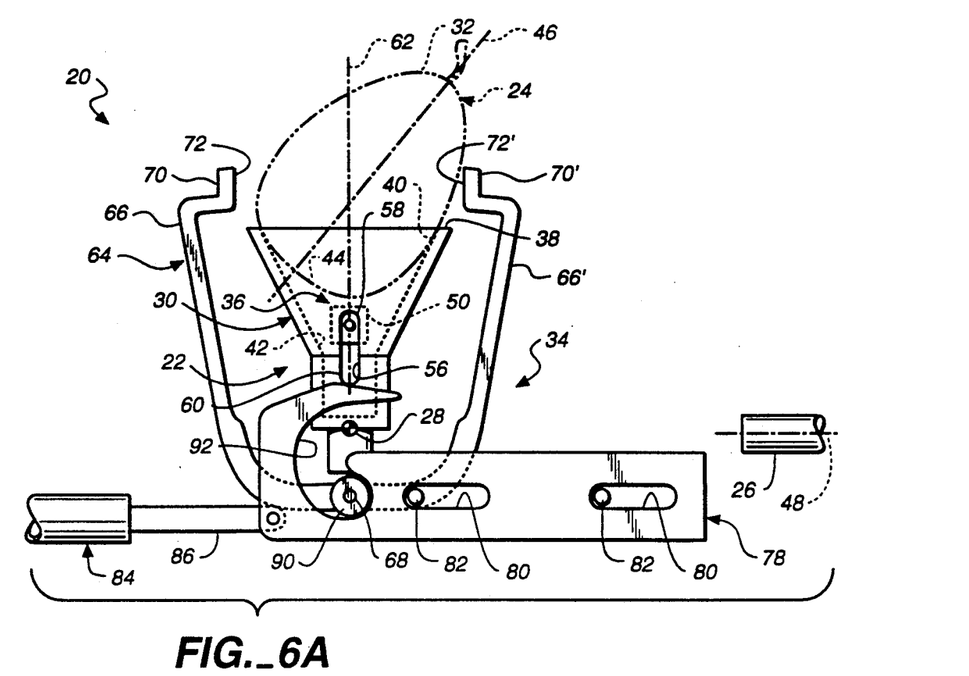
FIGS. 6A and 6B show a series of partially fragmentary, side elevational views of the coring apparatus of FIG. 3 and illustrating the produce improperly aligned and positioned in the coring cup.
Figure 6B:
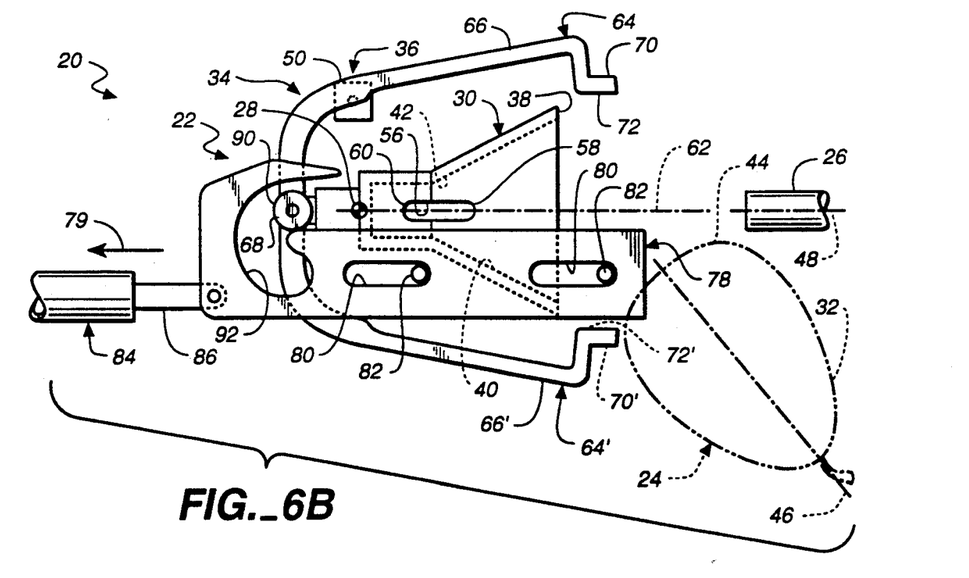

In contrast, when detecting means 36 determines that produce 24 is not properly oriented in coring cup 30, gripping members 64 and 64' are not move to the closed position to retain produce 24 against cup 30. As shown in FIGS. 6A and 6B, tapered neck portion 32 of produce 24 faces upwardly and is not situated in the narrow proximal end 42 of coring cup 30. Further, rounded bottom end 44 of produce 24 is not dimensioned to project sufficiently into narrow proximal end 42 to obstruct light beam 52 transmitted through elongated opening 56. Thus, light beam 52 is detected by receiver 54 which indicates improper orientation. Subsequently, produce 24 is removed from coring cup 30, as will be discussed henceforth.

In the preferred form, produce 24 is removed from coring cup 30 by pivotally moving holding assembly 22 or coring cup 30 to a position (FIG. 6B) where produce 24 may be gravitationally dispensed therefrom. The angle of inclination of coring cup 30 must be sufficient to cause produce 24 to roll or drop out of coring cup 30 free from additional influence. Preferably, this pivotal movement of coring cup 30 coincides with the movement of holding assembly 22 to the thrusting position, as shown in FIGS. 3B, 3C and 6B. Accordingly, depending on whether detecting means 36 detects proper produce orientation, gripping means 34 being responsive to detection of the proper orientation of produce 24 will either remain open or move to the closed position to retain produce 24 therein.

More specifically, when proper produce orientation is not detected, gripping members 64 and 64' will not move to the closed position to grip produce 24, as illustrated in FIGS. 6A and 6B, and produce 24 will be gravitationally dispensed from cup 30 when moved to the thrusting position. Hence, when holding assembly 22 is moved relative to coring tube 26 to prepare produce 24 for further processing, produce 24 will not be impaled by coring tube 26 because produce 24 will have been dispensed therefrom. Produce 24 may then be separated from the properly cored and peeled produce or automatically recycled through apparatus 20. By comparison, the prior art apparatus would have placed produce 24 onto coring tube 26 regardless of the orientation, as shown in FIG. 2.

Once detecting means 36 determines that produce 24 is properly oriented relative to coring cup 30, gripping members 64 and 64' being responsive to such proper determination will be moved to the closed position in an effort to secure produce 24 against coring cup 30. Thus, produce 24 will not be permitted to be gravitationally dispensed from coring cup 30 and may be moved relative to coring tube 26 for coring and peeling.

In the preferred embodiment, peeling and coring apparatus 20 includes a plurality of holding assemblies 22 aligned side-by-side for increased capability in which all assemblies perform the same functions simultaneously. Thus, to permit removal of an improperly oriented produce 24, a sufficient space must be provided between holding assembly 22 (in the thrusting position) and the corresponding coring tube 26, and peeling and halving knives (not shown) to permit produce 24 to pass therebetween. It is further preferable to slightly delay the relative motion between holding assembly 22 and coring tube 26 when assembly 22 is pivoted to the thrusting position. This allows produce 24 adequate time to be gravitationally removed from coring cup 30, for those assemblies 22 with improperly oriented produce 24, before relative motion occurs to permit further processing of the remaining holding assemblies with properly oriented produce.

The prior assemblies, as mentioned above, include stationarily mounted hook cam 25 (FIGS. 1A-1D). As the movable carriage (not shown) begins to move forward toward coring tube 15, the spring mechanism (not shown) causes holding mechanism 10 to pivot about pivotal axis 21 to the thrusting position. As indicated, cam roller 23 engages curved cam portion 27 which controls the pivotal motion of holding mechanism 10 between the receiving position and the thrusting position.

However, in accordance with the present invention and as shown in FIGS. 3A-3C, rather than moving the movable carriage (not shown) forward to induce pivotal motion of holding assembly 22, hook cam member 78 is moved rearwardly in the direction of arrow 79 (FIGS. 3B and 3C) to cause the same. This enables the movable carriage to remain relatively stationary during pivotal motion of holding assembly 22 about pivotal axis 28 before being thrust forward toward coring tube 26. Hence, holding assembly 22 is not moved forward during such pivotal movement which provides sufficient space for removing improperly orient produce 13 (FIG. 6B).

FIGS. 3A-3C illustrate that hook cam member 78 includes a pair sliding slots 80 extending longitudinally along a side portion of cam member 78. Slots 80 are formed and dimensioned to slidably receive pins 82 mounted to the stationary frame member not shown) of coring apparatus 20. Hence, pins 82 are stationary relative to coring tube 26.

Sliding movement of hook cam member 78 is controlled by an air cylinder 84 or the like operably coupled to and sequenced by coring apparatus 20. Air cylinder 84 includes a reciprocating piston shaft 86 having one end coupled to cam member 78 which is moved toward or away from cylinder 8 in the direction of the longitudinal axis of shaft 86. Accordingly, as shaft 86 is drawn into cylinder 84 in the direction of arrow 79 to a retracted position (FIGS. 3B and 3C), the spring mechanism (not shown) urges holding assembly 22 toward the thrusting position and, hence, induces cam roller 90 to move along curved cam portion 92 of hook cam member 78. Similarly, when cylinder 84 extends shaft 86 outward to an extended position (FIG. 3A), engagement of cam roller 90 with curved cam portion 92 moves holding assembly 22 back to the receiving position.

Once holding assembly 22 has pivotally reached the thrusting position, as shown in FIG. 3C, each pin 82 will have moved, relatively, from one end of slot 80 to the opposite end thereof. This relative motion corresponds to approximately three total inches of movement of hook cam member 78 along the longitudinal axis of shaft 86. It will be understood, however, that the movable carriage will have remained substantially stationary relative coring tube 26. Thus, this relative retention of movement of the carriage during pivotal motion of holding assembly 22 about axis 28 provides the sufficient amount of space between holding assembly 22 and coring tube 26 to permit an improperly oriented produce 24 to be gravitationally pass therebetween (FIG. 6B).

Moreover, in the preferred embodiment, once holding assembly 22 has been moved to the thrusting position, the movable carriage (not shown) may be advantageously delayed for a short period before being thrust forward toward coring tube 26. The short delay provides additional time for coring apparatus 20 to remove improperly oriented produce from coring cup 30.

Holding assembly 22 may be moved back to the receiving position (FIG. 5) when cylinder 84 pushes shaft 86 away from cylinder which slidably moves hook cam member 78 relative pins 82. Cam roller 90 then engages curved cam portion 92 which urges holding assembly 22 to pivot about pivotal axis 28 and back to the receiving position.

The sliding hook cam member 78 of the present invention provides a simple mechanism for providing sufficient space between holding assembly 22 and coring tube 26, peeling knives and halving knives to permit improperly oriented produce 24 to gravitationally pass therebetween. The cam member 78 may be retrofit to most existing coring apparatus to enable proper operation of the modified holding assembly 22 of the present invention without requiring substantial conversion costs and/or machinery modifications.

Coring cup 30 is preferably pivoted approximately 90° to the thrusting position. It will be appreciated, however, that this angle may vary according to design and necessity. That is, alternatively, coring cup 30 could pivot about pivotal axis 72 to a position sufficient to dispense produce 24 from coring cup 30 and then move back to the receiving position or other position for further processing. Moreover, in the preferred form, holding assembly 22 moves forward to impale produce 24 by coring tube 26. It will be understood, however, that coring tube 26 may move in the direction of produce 24 to cause impaling.

A continuous or intermittent air or water jet 94 (FIG. 4) may be directed at opening 56 to continuously or periodically remove produce debris or slurry deposition around opening 56. Such deposition, of course, could block the passage of light beam 52 of detecting means 36 which may cause detecting means 36 to falsely indicate that produce 24 is properly oriented. Accordingly, an air jet or water jet 74 may be directed at or pass through opening 56 continuously or periodically to remove this debris deposition. The source of jet 94 may be incorporated on or with optical transmitter 50 or may be mounted separately therefrom.

In another aspect of the present invention, a method is provided for insuring proper orientation of perishable produce 24 during further processing including the steps of depositing produce 24 into tapered coring cup 30 which is formed to receive the tapered neck portion 32 of produce 24 at the narrow end 42 of coring cup 30. Detecting the presence of tapered neck portion 32 sufficiently close to the narrow end 42 of coring cup 30 to indicate proper orientation of produce 24 relative to coring cup 30.

Upon failure of detecting means 36 to detect the proper orientation of produce 24 relative to coring cup 30, removing the produce from coring cup 30 prior to further processing produce 24 by peeling and coring apparatus 20. Upon detecting the proper orientation, gripping produce 24 by gripping means 34 for further manipulation of produce 24 to effect processing.

The removing step is accomplished by pivoting coring cup 30 about support member 28 to a skewed position sufficient to gravitationally remove produce 24 from coring cup 30. This skewed position coincides with the thrusting position (FIGS. 3C and 6B) which prepares produce 24 for further process should the orientation with respect to coring cup 30 be proper.

The detecting step is accomplished by passing light beam 52 through opening 56 extending through the narrow end 42 of coring cup 30. If contact of light beam 52 with the neck portion 32 of produce 24 is made, then detecting means 36 determines that produce 24 is properly oriented in coring cup 30.

The gripping step is accomplished in response to detection of the proper orientation of produce 24 should the neck portion 32 of produce 24 sufficiently project into narrow end 42 of coring cup 30 by a distance sufficient to indicate proper orientation of produce 24 relative to coring cup 30.

What is claimed is:

1. A coring apparatus for use with perishable produce having a tapered neck portion of reduced transverse dimension, said apparatus comprising:

holding means for supporting the produce including a tapered coring cup having a narrow proximal end, said coring cup formed to receive the produce;

detecting means aligned relative to said narrow proximal end for detecting the projection of said tapered neck portion into said narrow proximal end by a distance sufficient to indicate proper orientation of the produce relative to said coring cup;

removing means operably coupled to said detecting means for removing said produce from said coring cup upon failure to detect said proper orientation;

a coring tube; and means producing relative motion between said holding means and said coring tube to cause impaling of said produce by said coring tube when said detecting means detects said proper orientation.

2. The coring apparatus as defined in claim 1 wherein, said detecting means includes sensing means positioned proximate a viewing opening extending through the narrow proximal end of said coring cup, said sensing means detecting the presence of said extension of said tapered neck portion in said coring cup.

3. The coring apparatus as defined in claim 2 wherein, said sensing means includes optical transmitting means for transmitting a light beam through said viewing opening and positioned on a first side of said coring cup, and receiving means positioned on an opposite second side of said coring cup in alignment with said viewing opening for receipt of said light beam.

4. The coring apparatus as defined in claim 3 wherein, said light beam is infrared.

5. The coring apparatus as defined in claim 2 wherein, said sensing means includes pneumatic transmitting means for passing a fluid through said viewing opening and positioned on a first side of said coring cup, and receiving means positioned on an opposite second side of said coring cup in alignment with said viewing opening for receipt of said fluid.

6. The coring apparatus as defined in claim 5 further including means for producing a stream of fluid comprising air.

7. The coring apparatus as defined in claim 1 wherein, said detecting means includes a latch mechanism disposed in said narrow proximal end of said coring cup and engageable with said neck portion when the produce is properly oriented in said coring cup.

8. The coring apparatus as defined in claim 1 further including:

cam means for producing pivotal movement of said holding means about a pivotal axis between a receiving position and a thrusting position; and retaining means for retaining said pivotal axis in a fixed spatial relation relative said coring tube.

9. The coring apparatus as defined in claim 8 wherein, said cam means includes a hook cam member defining a curved cam portion and a cam roller member rotatably mounted to said holding means, said roller member being formed for engagement with said curved cam portion to pivotally move said holding means between said receiving position and said thrusting position.

10. The coring apparatus as defined in claim 9 wherein, said retaining means includes a pin member positioned in a fixed spatial relation relative said coring tube, and an elongated slot extending longitudinally through a side portion of said hook cam member, said slot being formed and dimensioned for slidable receipt of said pin member for enabling movement of said cam member between an extended position, corresponding to said receiving position, and a retracted position, corresponding to said thrusting position.

11. The coring apparatus as defined in claim 10 wherein, said retaining means further includes piston means operably coupled to said hook cam member for linear movement of said hook cam member between said extended position and said retracted position.

12. The coring apparatus as defined in claim 11 wherein, said piston means includes an air cylinder.

13. The coring apparatus as defined in claim 1 further including:

gripping means mounted to said support member and operably coupled to said detecting means and movable between a gripping position for gripping the produce while in said coring cup and a non-gripping position, said gripping means being responsive to detection of said proper orientation of said produce by said detecting means to grip the produce.

14. The coring apparatus as defined in claim 13 wherein, said gripping means includes at least one pair of elongated gripping arms extending along opposite sides of said coring cup, each gripping arm including a respective finger portion extending inwardly toward the produce from the distal ends thereof and formed to engage the surface of the produce.

15. The coring apparatus as defined in claim 14 wherein, said gripping arms are movably coupled to a pneumatically driven mechanism activated in response to detection of said proper orientation of the produce by said detecting means to grip the produce.

16. The coring apparatus as defined in claim 1 wherein, said coring cup is funnel-shaped.

17. A coring apparatus as defined in claim 1 further including:

peeling means positioned for engagement with a surface of the produce for peeling thereof when the produce is impaled by said coring tube.

18. In a coring apparatus for use with a perishable produce having a tapered neck portion of reduced transverse dimension, the apparatus including a tapered coring receptacle formed to receive the produce and pivotal about a pivotal axis between a receiving position and a thrusting position for thrusting the produce onto a coring tube for peeling and coring of the produce, the improvement in said apparatus comprising:

detecting means aligned relative to a narrow proximal end of said coring receptacle for detecting the projection of said tapered neck portion into the narrow proximal end of said coring receptacle by a distance sufficient to indicate proper orientation of the produce relative to said coring receptacle; and gripping means operably coupled to said detecting means and movable between a gripping position for gripping the produce while in said coring receptacle and a non-gripping position, said gripping means being responsive to detection of said proper orientation of said produce by said detecting means to grip the produce.

19. The coring apparatus as defined in claim 18 wherein, said detecting means includes sensing means positioned proximate a viewing opening extending through the narrow proximal end of said coring receptacle, said sensing means detecting the presence of said extension of said tapered neck portion in said coring receptacle.

20. The coring apparatus as defined in claim 19 wherein, said sensing means includes optical transmitting means for transmitting a light beam through said viewing opening and positioned on a first side of said coring receptacle, and receiving means positioned on an opposite second side of said coring receptacle in alignment with said viewing opening for receipt of said light beam.

21. The coring apparatus as defined in claim 20 wherein, said gripping means includes at least one pair of elongated gripping arms extending along opposite sides of said coring receptacle, each gripping arm including a respective finger portion extending inwardly toward the produce from the distal ends thereof and formed to engage the surface of the produce.

22. The coring apparatus as defined in claim 21 wherein, said gripping arms are movably coupled to a pneumatically driven mechanism activated in response to detection of said proper orientation of the produce by said detecting means to grip the produce.

23. The coring apparatus as defined in claim 18 further including:

cam means for producing said pivotal movement of the coring receptacle between said receiving position and said thrusting position; and retaining means for retaining said pivotal axis in a fixed spatial relation relative the coring tube.

24. The coring apparatus as defined in claim 23 wherein, said cam means includes a hook cam member defining a curved cam portion and a cam roller member rotatably mounted to the coring receptacle, said roller member being formed for engagement with said curved cam portion to pivotally move the coring receptacle between said receiving position and said thrusting position.

25. The coring apparatus as defined in claim 24 wherein, said retaining means includes a pin member positioned in a fixed spatial relation relative said coring tube, and an elongated slot extending longitudinally through a side portion of said hook cam member, said slot being formed and dimensioned for slidable receipt of said pin member for enabling movement of said cam member between an extended position, corresponding to said receiving position, and a retracted position, corresponding to said thrusting position.

26. In a method for insuring proper orientation of perishable produce during produce processing, said produce having a tapered neck portion of reduced transverse dimension including the steps of depositing the produce into a tapered coring cup formed to receive and orient the produce, and processing the produce, the improvement in said method comprising the steps of:

detecting the presence or absence of said tapered neck portion at a location sufficiently close to a narrow end of said coring cup, said presence indicating proper orientation of the produce relative to said coring cup and said absence indicating improper orientation;

upon detecting said absence, removing the produce from said coring cup prior to said processing step; and upon detecting said presence, gripping the produce by gripping means for further manipulation of said produce for processing.

27. The method as defined in claim 26 wherein, said removing step is accomplished by pivoting said coring cup about a pivotal axis to a position sufficiently skewed to gravitationally remove the produce from said coring cup.

28. The method as defined in claim 26 wherein, said detecting step comprises passing a light beam through an opening extending through the narrow end of said coring cup to detect the presence or absence of the neck portion of the produce when properly oriented in said coring cup and sensing said light beam passing through said opening.

29. The method as defined in claim 28 wherein, said passing step is accomplished by transmitting an infrared beam from a transmitting means through said opening; and said sensing step comprises sensing said infrared light beam when said produce is not properly oriented in said coring cup.

30. The method as defined in claim 26 further including:

said gripping step is accomplished in response to detection of said proper orientation of the produce by detecting means.

31. The method as defined in claim 26 wherein, said processing step includes moving the produce by relative motion between said coring cup and a coring tube to cause impaling of said produce by said coring tube.

32. The method as defined in claim 31 further including the step of:

positioning peeling means for engagement with a surface of the produce to effect peeling thereof.

33. The produce processing method as defined in claim 26 wherein, said produce comprises a fruit.

34. The produce processing method as defined in claim 33 wherein, said fruit is a pear.

35. A method for insuring proper orientation of perishable produce during produce processing, said produce having a tapered neck portion of reduced transverse dimension, said method comprising steps of:

aligning the produce for placement into a tapered coring cup formed to receive the produce;

placing the aligned produce into said coring cup;

detecting the presence or absence of said tapered neck portion in a location sufficiently close to a narrow end of said coring cup, said presence indicating proper orientation of the produce relative to said coring cup and said absence indicating improper orientation;

upon detecting said absence, removing the produce from said coring cup prior to further produce processing; and upon detecting said presence, gripping the produce by gripping means for further manipulation of said produce for further produce processing.

36. The method as defined in claim 35 wherein, said removing step comprises pivoting said coring cup about a pivotal axis to a position sufficiently skewed to gravitationally remove the produce from said coring cup.

37. The method as defined in claim 35 wherein, said detecting step comprises passing a light beam through an opening extending through the narrow end of said coring cup to detect the presence or absence of the neck portion of the produce when properly oriented in said coring cup and securing said light beam passing through said opening.

38. A coring apparatus for use with perishable produce having a tapered neck portion of reduced transverse dimension, said apparatus comprising:

holding means for supporting the produce including a tapered coring receptacle having a narrow proximal end, said coring receptacle formed to receive the produce;

detecting means aligned relative to said narrow proximal end for detecting the projection of said tapered neck portion into said narrow proximal end by a distance sufficient to indicate proper orientation of the produce relative to said coring receptacle;

removing means operably coupled to said detecting means for removing said produce from said coring receptacle upon failure to detect said proper orientation;

a coring tube; and means producing relative motion between said holding means and said coring tube to cause impaling of said produce by said coring tube when said detecting means detects said proper orientation.

39. The coring apparatus as defined in claim 38 wherein, said detecting means includes sensing means positioned proximate a viewing opening extending through the narrow proximal end of said coring receptacle, said sensing means detecting the presence of said extension of said tapered neck portion in said coring receptacle.

40. The coring apparatus as defined in claim 39 wherein, said sensing means includes optical transmitting means for transmitting a light beam through said viewing opening and positioned on a first side of said coring receptacle, and receiving means positioned on an opposite second side of said coring receptacle in alignment with said viewing opening for receipt of said light beam.

41. The coring apparatus as defined in claim 38 wherein, said detecting means includes a latch mechanism disposed in said narrow proximal end of said coring receptacle and engageable with said neck portion when the produce is properly oriented in said coring receptacle.

* * * * *